(12) United States Patent
Synnestvedt

(10) Patent No.: US 7,237,026 B1
(45) Date of Patent: Jun. 26, 2007

(54) SHARING GATEWAY RESOURCES ACROSS MULTI-POP NETWORKS

(75) Inventor: Robert Glenn Synnestvedt, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 532 days.

(21) Appl. No.: 10/104,299

(22) Filed: Mar. 22, 2002

(51) Int. Cl.
*G06F 15/173* (2006.01)

(52) U.S. Cl. ............... 709/225; 709/203; 709/217; 709/218; 709/219; 709/226; 710/39

(58) Field of Classification Search ......... 709/202, 709/203, 206, 217, 218, 219; 710/39; 370/352
See application file for complete search history.

(56) References Cited

U.S. PATENT DOCUMENTS

| | | | |
|---|---|---|---|
| 4,694,487 A | 9/1987 | Chang et al. | |
| 6,108,306 A | 8/2000 | Kalkunte et al. | |
| 6,151,688 A * | 11/2000 | Wipfel et al. | 714/48 |
| 6,185,288 B1 | 2/2001 | Wong | |
| 6,279,054 B1 | 8/2001 | Boyle | |
| 6,324,264 B1 | 11/2001 | Wiener et al. | |
| 6,363,065 B1 | 3/2002 | Thornton et al. | |
| 6,490,344 B1 | 12/2002 | Murai et al. | |
| 6,556,659 B1 | 4/2003 | Bowman-Amuah | |
| 6,584,093 B1 | 6/2003 | Salama et al. | |
| 6,584,529 B1 * | 6/2003 | Thomas | 710/240 |
| 6,625,645 B1 | 9/2003 | Van Horne et al. | |
| 6,654,366 B1 * | 11/2003 | Ketcham | 370/352 |
| 6,714,515 B1 | 3/2004 | Marchand | |
| 6,765,903 B1 | 7/2004 | Allen et al. | |
| 6,798,771 B1 | 9/2004 | Low et al. | |
| 6,856,676 B1 | 2/2005 | Pirot et al. | |
| 6,862,626 B1 | 3/2005 | Ryu | |
| 6,883,033 B2 | 4/2005 | Maruyama et al. | |
| 6,909,711 B1 | 6/2005 | Noguchi | |
| 6,961,857 B1 | 11/2005 | Floryanzia | |
| 6,980,515 B1 | 12/2005 | Schunk et al. | |
| 7,075,922 B2 | 7/2006 | Mussman et al. | |
| 2001/0047333 A1 | 11/2001 | Kim et al. | |
| 2002/0075844 A1 | 6/2002 | Hagen | |
| 2002/0078119 A1 * | 6/2002 | Brenner et al. | 709/201 |
| 2002/0085569 A1 | 7/2002 | Inoue | |
| 2002/0107952 A1 | 8/2002 | Mancusi et al. | |
| 2002/0122417 A1 | 9/2002 | Miller et al. | |
| 2002/0160811 A1 | 10/2002 | Jannette et al. | |
| 2003/0002476 A1 | 1/2003 | Chung et al. | |

(Continued)

OTHER PUBLICATIONS

Khalil et al., Implementation of a Bandwidth Broker for Dynamic End-to-End Resource Reservation in Outsourced Virtual Private Network, Local Computer Networks, 2000, LCN 2000, Proceedings, 25th Annual IEEE Conference, Nov. 8-10, 2000, pp. 511-519.

*Primary Examiner*—Yves Dalencourt
(74) *Attorney, Agent, or Firm*—Marger Johnson & McCollom, P.C.

(57) ABSTRACT

A network device and method for sharing resources in a network. The network device includes a port through which a shared resource request may be received. A processor accesses a store of the shared resource data to determine if the shared resource request is grantable. If the request is grantable, the network device may grant the request and then update the shared resource data.

10 Claims, 3 Drawing Sheets

U.S. PATENT DOCUMENTS

2003/0051195 A1  3/2003  Bosa et al.
2003/0065741 A1  4/2003  Vo
2003/0074576 A1  4/2003  Kelly
2004/0030752 A1*  2/2004  Selgas et al. ............... 709/206

* cited by examiner

SHARING GATEWAY RESOURCES ACROSS MULTI-POP NETWORKS

CROSS REFERENCE TO RELATED APPLICATIONS

This application is being filed with the related, copending applications as set forth below:

U.S. patent application Ser. No. 10/104,817 entitled "RESOURCE AND AAA SERVICE DEVICE" filed on Mar. 22, 2002, which is still pending.

U.S. patent application Ser. No. 10/104,816 entitled "VOICE AND DIAL SERVICE LEVEL AGREEMENT ENFORCEMENT ON UNIVERSAL GATEWAY," filed on Mar. 22, 2002, which is still pending.

U.S. patent application Ser. No. 10/104,819 entitled "SEGREGATING SERVICE LEVEL AGREEMENTS ACROSS LARGE-SCALE NETWORKS" filed on Mar. 22, 2002, which is still pending.

U.S. patent application Ser. No. 10/104,820 entitled "EXPEDITING PORT RELEASE IN DISTRIBUTED NETWORKS" filed on Mar. 22, 2002, which is still pending

BACKGROUND

1. Field

This disclosure relates to networks with multiple gateways, more particularly to sharing network resources across multiple gateways.

2. Background

A gateway is any entity that allows a user to enter a network. For example, a point-of-presence (POP) may have several universal gateways through which users may access a network via a dial-up connection. The entry is normally obtained through a port. In wholesale networks, the use of the port may be associated with one of several different customers.

A wholesale network typically comprises a set of equipment and lines that are all connected, including POPs. Several different customers, such as Internet Service Providers (ISP) may lease the network. The lease is generally governed by a guarantee of a minimum number of ports for a particular cost. These leases will be referred to as service level agreements (SLA), which may also govern the particular mix of traffic allowed for a particular customer, as well as overflow resources.

The SLA may provide two different levels of service for each customer. One level guarantees a fixed access count and another level provides access to a pool of shared resources. Currently, all of the SLAs are controlled and administered by one server somewhere in the network. A single server allows the network to communicate allocation of shared resources across the network. However, the single server may become a chokepoint, as it cannot handle the call volumes expected within larger networks. With the advent of any-service-any-port networks, where the network may provide a mix of voice and dial traffic in very high volumes, having one server for port policy management will cause problems.

The management of the SLAs may be distributed across the network, where several different network devices handle the processing of the administrative tasks associated with enforcement of the SLAs. However, the allocation of the shared resource cannot be independently controlled on each customer SLA servers, since the shared resource allocation decisions must be shared across all affected customers. Therefore, distributing port policy decisions that are shared across resources must be handled differently.

SUMMARY

An embodiment of the invention is a network device, which may be referred to as a point-of-presence (POP) manager. The POP manager receives a shared resource request and then access a store that contains shared resource data. If the shared resource data indicates that the request is grantable, the POP manager may grant the request. If the request is granted, the POP manager then updates the shared access data to reflect the newly granted request.

Another embodiment is a method to manage shared resources. The method includes receiving a shared resource request and accessing shared resource data to determine if the request is grantable. If the shared resource request is grantable, the method updates the shared resource data to reflect the newly granted request.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
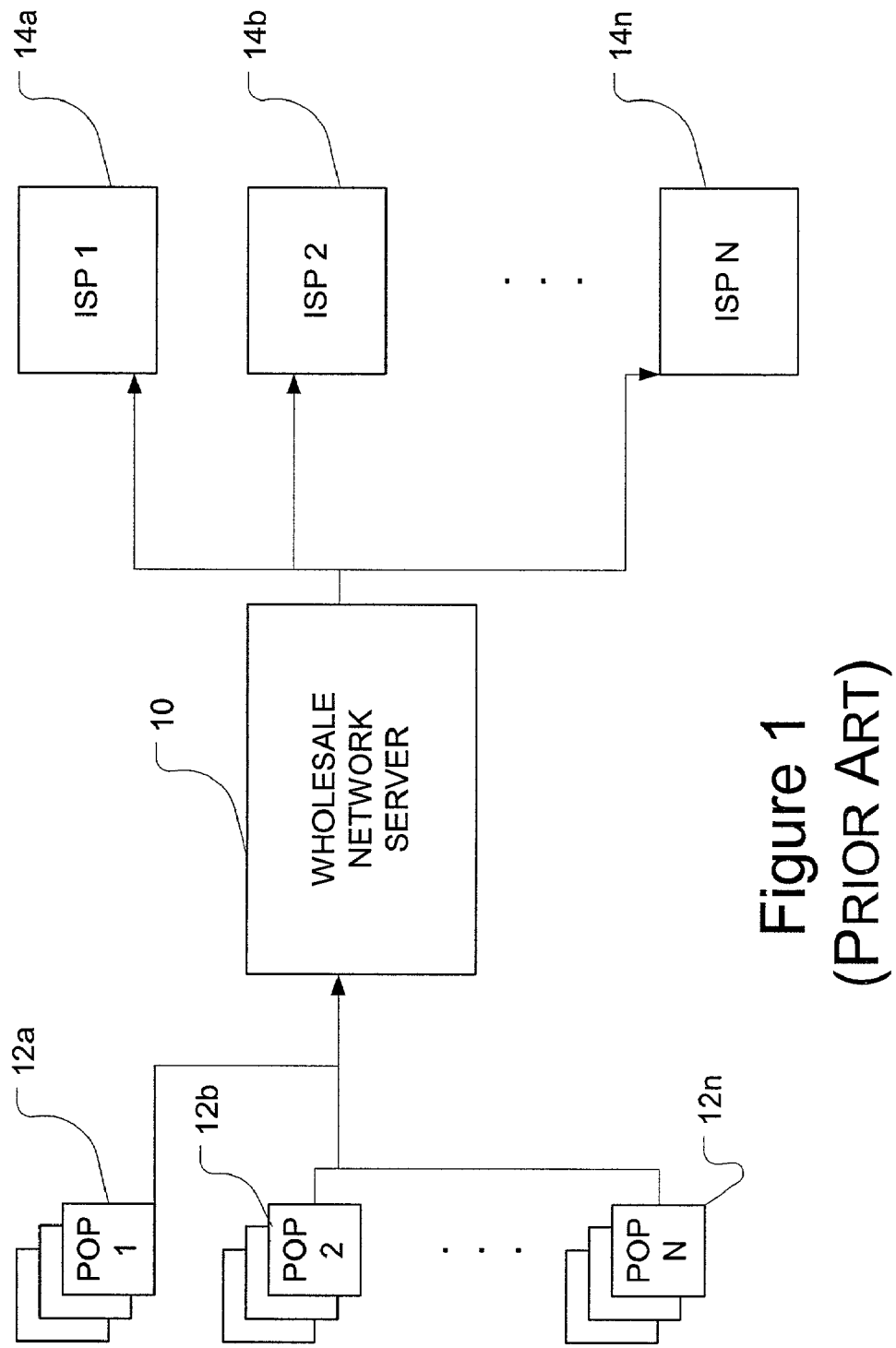
FIG. 1 shows a prior art embodiment of a wholesale network.

FIG. 1 shows a prior art embodiment of a wholesale network. Users access the network through a series of points-of-presence (POP) 12*a*–12*n*. The POP then sends an authentication request, such as a remote access dial-in user service (RADIUS) authentication request to the wholesale network server 10. The wholesale network server then authenticates and authorizes the user's access. The user is associated with a customer that uses the network. The accounting and usage data is eventually transmitted to the customers, in this case Internet Service Providers (ISP) 14*a*–14*n*.

The customer agreements are administered by the network server, as are the port policies. This leads to a problem when the network has to handle a high traffic volume. The wholesale network server 10 becomes a bottleneck for the rest of the network, as users cannot gain access until the authentication requests are processed and the call volume per second may quickly exceed the number of calls per second the wholesale network server 10 can handle.

With the advent of any service any port (ASAP) networks, the traffic volume increases as the network handles both voice and data traffic. Wholesalers typically apply port policy management procedures, such as allowing customers a set number of ports across all of the POPs in the network to which the customer has access. The approach allocates resources on a per customer basis. The percentage of total resources available for a give customer is fixed.

A more flexible model would be to provide two levels of service to customers, one a guaranteed access count of ports the other access to shared resources. Implementation in the system shown in FIG. 1 would be administered by the wholesale network server. In addition to administering the customer agreements, the wholesale network server now needs to administer port policy management. This is problematic as the number of POPs and the associated ports could expand beyond the capacity of the server.

While administration of the shared resources in a centralized fashion allows for high control of the allocation of the shared resources, it leads to further bottlenecks. In one solution, a customer service level agreements (SLA) server could administer the customer SLAs. As the network expands and contracts, the processing of each SLA could be moved to dedicated servers or other devices, or can be collapsed into fewer devices with relative ease. However, the customer SLA servers should not handle the port policy management, as it must be coordinated across all affected customers. The communications necessary to ensure that each customer SLA server had the current shared resource information would contribute to the network traffic, decrease the network efficiency and increase the network overhead.

In one embodiment of the invention, a distributed network is established, with tasks such as customer SLA enforcement and tracking, port policy management and the routing of administrative data, handled separately. However, these separated functions must be coordinated across the network. One embodiment of such a network is shown in FIG. 2.

Figure 2:
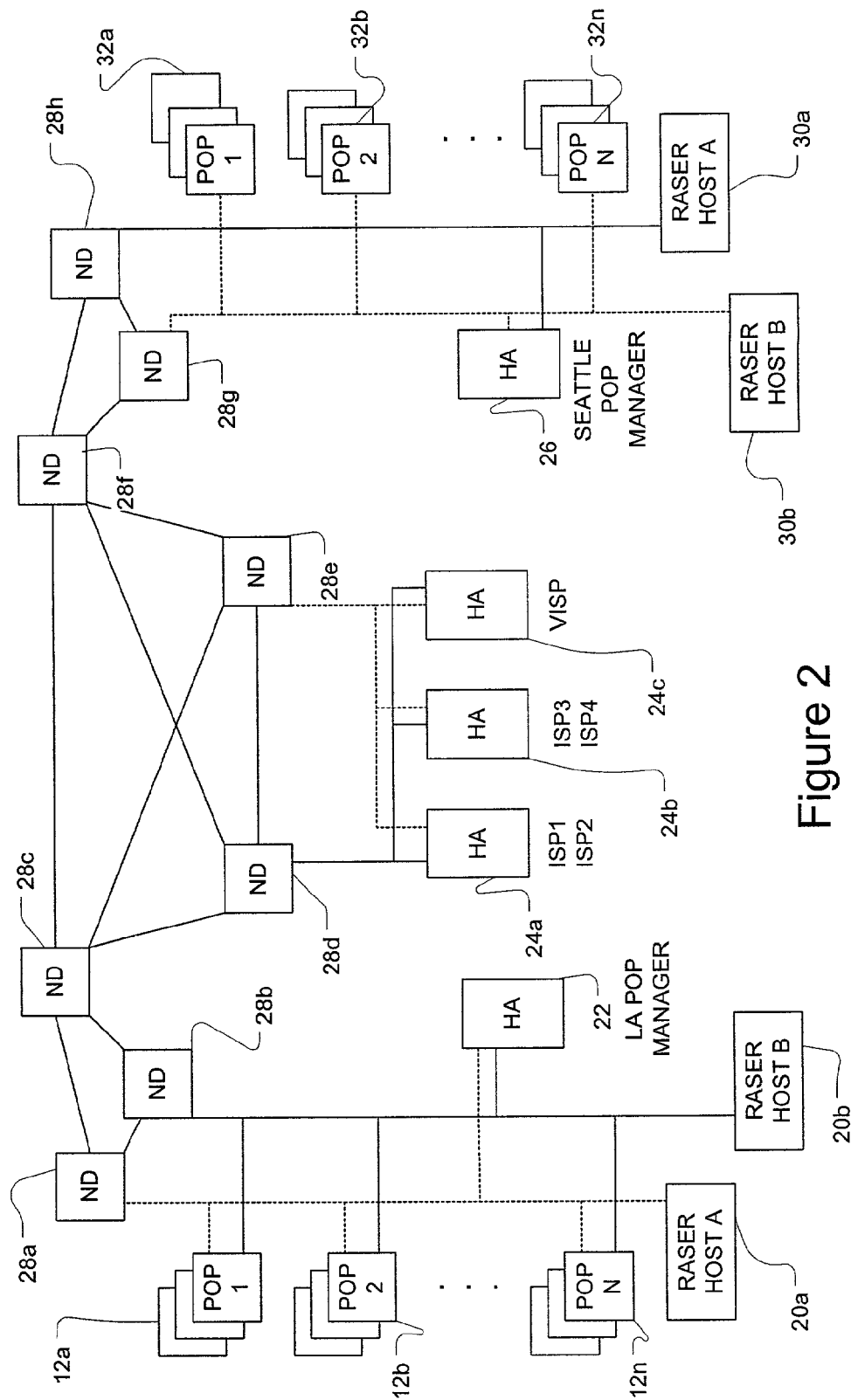
FIG. 2 shows an embodiment of a wholesale network, in accordance with the invention.

The wholesale network shown in FIG. 2 has 5 service providers that use the network, ISPs 1–4 and a Voice over Internet Service Provider (VISP). The customer SLA servers are shown as high availability servers (HA) 24a through 24c. In addition, there are POP managers. In this example, there is a POP manager 22 to administer all of the POPs in Los Angeles, and a POP manager 26 to manage all of the POPs in Seattle. POPs 12a–12n are located on the Los Angeles portion of the network, and POPs 32a–32n are the POPs in the Seattle portion of the network.

In addition to the customer SLA servers, the POP managers and the POPs, there are network devices 28a–28h that provide connectivity between the various points on the network, and RASERs 20a, 20b, 30a and 30b. RASERs are Remote Authentication, Authorization and Accounting (AAA) SERvice devices that receive and route all of the administrative data to allow the network to run more efficiently. However, these particular devices are optional.

The POPs receive the same information related to the user's identification, from which the customer affiliation may be determined, as well as the port identification and information that may be used by the POP manager. The POPs could forward this information to the customer SLAs and the POP managers. However, using the RASERs has several advantages, particularly in moving the processing of the various identifications and sorting out of which administrative data goes where away from the POPs.

Figure 3:
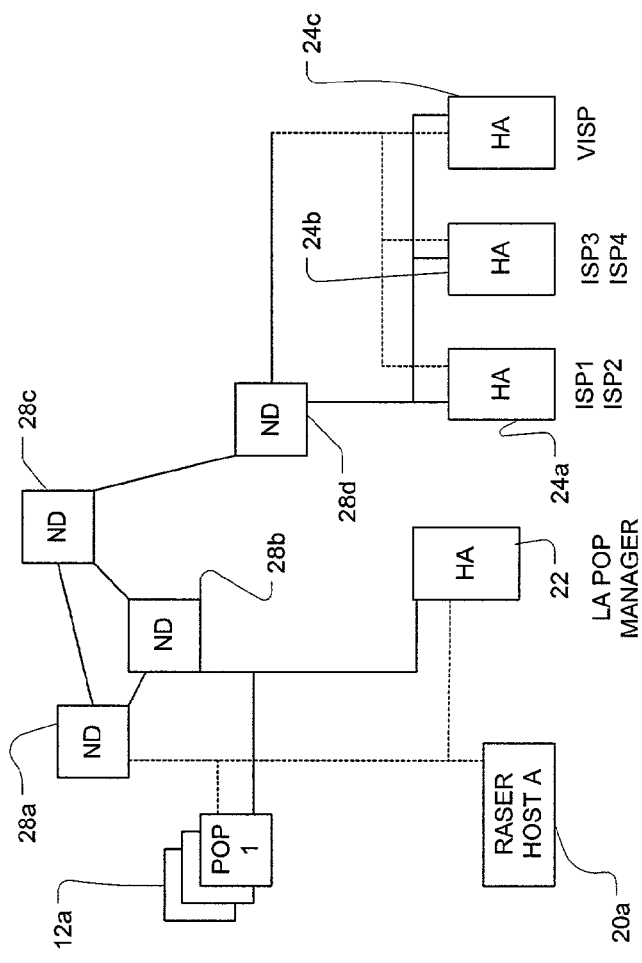
FIG. 3 shows a portion of a wholesale network, in accordance with the invention.

For ease of discussion, a portion of the network shown in FIG. 2 is shown in FIG. 3. It must be noted that neither of these network architectures are intended in any way to limit the scope of the invention and are only intended as examples. Turning now to the devices shown in FIG. 3, it is possible to follow a typical call flow. A gateway or other entry device within the POP 12a issues an authentication request, which may or may not come from a RADIUS request. The authentication request is transmitted to the RASER 20a from the gateway within the POP 12a. The RASER 20a then routes the authentication request to a customer SLA, or policy, server, which in this example will be assumed to be ISP 1 server 24a. These messages are transmitted via the various network devices as determined by the traffic flow.

The policy server 24a then determines if the customer agreement is provisioned for sharing. Sharing typically happens in an overflow situation. For example, ISP 1 may have a guaranteed service level for one hundred thousand (100K) access points, with access to a shared pool of twenty five thousand (25K) on a first-come-first-served basis. For purposes of this example, an overflow condition will be assumed, in which case the policy server 24a issues a shared resource request, because the guaranteed access count has been exceeded.

The shared resource request is routed via the RASER 20a to the POP manager 22 that has responsibility for that POP. The POP server will either accept the shared resource request or not, depending upon the shared resource data that the POP manager 22 maintains. The shared resource data includes the number of available shared resources. If shared resources are available, the request is granted and the shared resources data is updated. If shared resources are not available, the request is denied. The POP manager 22 returns the response to the RASER 22a, which then returns the response to the gateway within the POP 12a and the policy server 24a.

Figure 4:
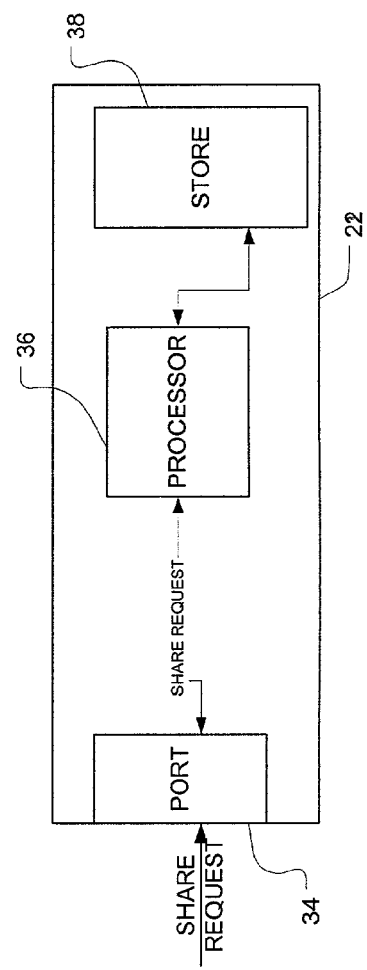
FIG. 4 shows an embodiment of a network device, in accordance with the invention.

The POP manager may be any network device that can receive shared resource requests, access a store that contains the shared resource data and can then determine, from the shared resource data, whether the request can be granted. An example of such a device is shown in FIG. 4. It must be noted that the POP manager may not be a dedicated device, but will take the form of an article of computer-readable code readable by the processor in the network device that, when executed, causes the processor to perform the methods of the invention. The POP manager may reside coincident with a customer SLA server, a RASER or other network devices.

In FIG. 4, the POP manager includes a port 34 through which a shared resource request may be received. The port transmits the request to a processor 36, which accesses the shared resource data. The shared resource data is the current state of the shared resource pool. The processor then determines if the share request is grantable depending upon the shared resource data. If it is grantable, the POP manager may issue an acceptance and update the shared resource data. If the request is denied, then the POP manager transmits that message back to the requesting device. The shared resource data may also contain data for several different shared resource policies, where the shared resource policy may depend upon the time of day, the traffic mix between voice and data, and the overall condition of the network, among other factors.

Thus, although there has been described to this point a particular embodiment for a method and apparatus for managing shared resources in a distributed network, it is not intended that such specific references be considered as limitations upon the scope of this invention except in-so-far as set forth in the following claims.

What is claimed is:

1. A network device to administer a set of points of presence in a network, comprising:
    a port to allow reception of a shared resource request related to one of the set of points of presence across a network from a customer policy server for access to a shared pool of network access points in a network by the one of the set of points of presence;
    a storage to store shared resource data; and
    a processor to:

access the shared resource data in response to the shared resource request;

determine if the shared resource request is grantable based upon the shared resource data, wherein the shared resource data includes a number of available shared network access points in a shared resource pool and at least one shared resource policy;

transmit an acceptance of the shared resource request back to the customer policy server to allow the one of the set of points of presence to access a resource in the shared resource pool if the shared resource request is grantable; update the shared resource data to include the granted shared resource request; and if the shared resource request is denied, transmit a message back to the customer policy server.

2. The network device of claim 1, wherein the shared resource data includes several shared resource policies.

3. The network device of claim 1, wherein the processor is also operable to determine a shared resource policy with which the shared resource request is associated.

4. A method for managing shared resources in a network, the method comprising:

receiving a shared resource request across a network from a customer for access to a shared pool of network access points by one of a set of points of presence in the network;

accessing shared resource data in response to the request;

determining if the shared resource request is grantable based upon the shared resource data, wherein the shared resource data includes a number of available shared network access points in a shared resource pool and at least one shared resource policy; transmitting an acceptance of the shared resource request back to the customer to allow the one of the set of points of presence to access a resource in the shared resource pool, if the shared resource request is grantable; updating the shared resource data to include the granted shared resource request; and if the shared resource request is denied, transmitting a message.

5. The method of claim 4, wherein accessing the shared resource data further comprises determining with which of a number of shared resource policies the shared resource request is associated.

6. A network device, comprising:

a means for allowing reception of a shared resource request across a network from a customer for access to a shared pool of network access points by one of a set of points of presence in the network;

a means for storing shared resource data; and a means for:

accessing the shared resource pool in response to the shared resource request;

determining if the shared resource request is grantable based upon the shared resource data, wherein the shared resource data includes a number of available network access points in a shared resource pool and at least one shared resource policy; and transmitting an acceptance of the shared resource request back to the customer policy server to allow the one of the set of points of presence to access a resource in the shared resource pool if the shared resource request is grantable; update the shared resource data to include the granted shared resource request; and if the shared resource request is denied, transmit a message back to the customer policy server.

7. The network device of claim 6, wherein the shared resource data includes several shared resource policies.

8. The network device of claim 6, wherein the means for accessing is also a means for determining a shared resource policy with which the shared resource request is associated.

9. An article of computer-readable storage media including machine-readable code that, when executed, causes a processor in a device to:

receive a shared resource request across a network from a customer for access to a shared pool of network access points by one of a set of points of presence in the network;

access shared resource data in response to the request;

determine if the shared resource request is grantable based upon the shared resource data, wherein the shared resource data includes a number of available network access points in a shared resource pool and at least one shared resource policy; transmitting an acceptance of the shared resource request back to the customer to allow the one of the set of points of presence to access a resource in the shared resource pool, if the shared resource request is grantable; updating the shared resource data to include the granted shared resource request; and if the shared resource request is denied, transmitting a message back to the customer.

10. The article of claim 9, wherein the code, when executed, causing the processor to access the shared resource data, which further causes the machine to determine with which of a number of shared resource policies the shared resource request is associated.

\* \* \* \* \*

UNITED STATES PATENT AND TRADEMARK OFFICE
CERTIFICATE OF CORRECTION

| | | |
|---|---|---|
| PATENT NO. | : 7,237,026 B1 | Page 1 of 1 |
| APPLICATION NO. | : 10/104299 | |
| DATED | : June 26, 2007 | |
| INVENTOR(S) | : Robert G. Synnestvedt | |

It is certified that error appears in the above-identified patent and that said Letters Patent is hereby corrected as shown below:

At column 5, line 39, please replace "message." with --message back to the customer.--

Signed and Sealed this

Sixteenth Day of October, 2007

JON W. DUDAS
*Director of the United States Patent and Trademark Office*